United States Patent [19]

Lenz

[11] Patent Number: 5,566,319
[45] Date of Patent: Oct. 15, 1996

[54] SYSTEM AND METHOD FOR CONTROLLING ACCESS TO DATA SHARED BY A PLURALITY OF PROCESSORS USING LOCK FILES

[75] Inventor: Norbert Lenz, Magstadt, Germany

[73] Assignee: International Business Machines Corporation, Armonk, N.Y.

[21] Appl. No.: 58,702

[22] Filed: May 6, 1993

[30] Foreign Application Priority Data

May 6, 1992 [EP] European Pat. Off. .............. 92107592

[51] Int. Cl.$^6$ .............................. G06F 13/14; G06F 13/00
[52] U.S. Cl. .......................... 395/474; 395/477; 395/479; 395/472; 395/490; 395/200.08; 395/726; 364/134; 364/DIG. 1
[58] Field of Search ..................................... 395/425, 725, 395/650, 375, 457, 474, 475, 479, 481, 483, 471, 472, 490, 726, 477, 478, 495, 200.08; 380/4, 3; 364/134

[56] References Cited

U.S. PATENT DOCUMENTS

| | | | |
|---|---|---|---|
| 4,965,719 | 10/1990 | Shoens et al. | 395/650 |
| 5,230,070 | 7/1993 | Liu | 395/472 |

FOREIGN PATENT DOCUMENTS

| | | |
|---|---|---|
| 0142820 | 5/1985 | European Pat. Off. . |
| 0145889 | 6/1985 | European Pat. Off. . |
| 0351556 | 1/1990 | European Pat. Off. . |

OTHER PUBLICATIONS

"Enterprise Systems Architecture/390: System/360 and System/370 I/Interface Channel to Control Unit Original Equipment Manufacturers Information," IBM Corp. (DA3AR110 GA22–6974–10), copyright 1971, '78, '81, '83, '84, '87 and '92.

"Storage Subsystem Library: IBM 3990 Storage Control Reference," IBM Corp. (A13R1000 GA32–0099–05), copyright 1988, 1993.

Enterprise Systems Architecture/390 "Principles of Operation," IBM Corp. (SA22–7201–00), copyright 1990.

ACM Transactions on Computer Systems, Bd. 9, No. 1, Feb., 1991, pp. 21–65, "Algorithms for Scalable Synchronization on Shared–Memory Multiprocessors", by Mellor–Crummey et al.

*Primary Examiner*—Glenn Gossage
*Attorney, Agent, or Firm*—Arthur J. Samodovitz

[57] ABSTRACT

A system and method for controlling access to data in storage which is shared by a plurality of processors are disclosed. The shared storage is located outside of main storage of each of the processors and stores a lock file. The lock file comprises a plurality of control fields containing access administration information (ZVI) authorizing the processors to access the data when not currently being accessed by another processor and a status identification code (SKC) to indicate the status of the access administration information. In response to a data access request from one of the processors, the status identification code provided by the processor is compared to the stored status identification code. If the comparison indicates that the requesting processor is authorized to update the access administration information, the access administration information associated with the requesting processor for the type of data access request is written from the requesting processor to the shared storage without first reading the stored access administration information from the lock file. The status identification code in the storage is updated to indicate that the processor has updated the access administration information.

7 Claims, 6 Drawing Sheets

SYSTEM AND METHOD FOR CONTROLLING ACCESS TO DATA SHARED BY A PLURALITY OF PROCESSORS USING LOCK FILES

BACKGROUND OF THE INVENTION

The invention relates generally to computer systems and deals more particularly with control of access to shared data.

Executing multiple application programs in multiprocessor systems usually requires control information that specifies whether and on what conditions one of several processors may access shared data (for example, a record) and read and/or change it by write operations.

Once a particular processor has been authorized to read or write such a shared record, a lock instruction keeps the other processors from accessing the shared record at the same time. After the authorized processor has completed its operation on the shared record, an unlock instruction releases the record for further access requests.

According to the state of the art, a separately addressable table or database (referred to as a global lock table in English or as a lock file in the IBM VSE operating system) is provided for access administration and control.

Figure 1:
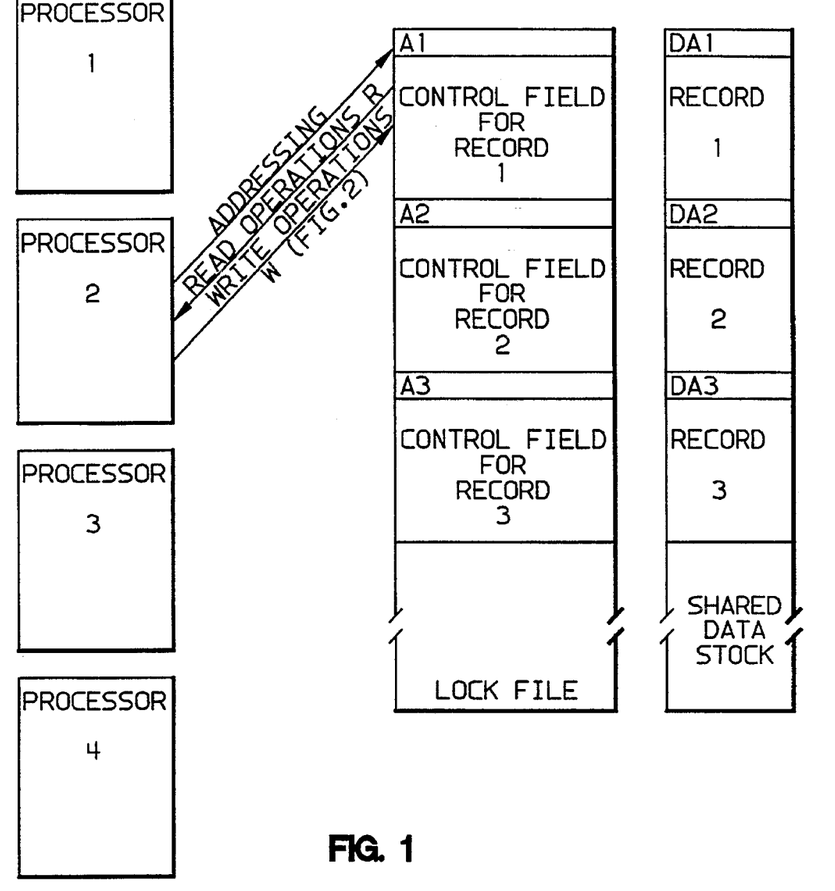
FIG. 1 is a schematic of a multiprocessor system according to the prior art with a shared data stock and a lock file for access administration and control purposes.

The lock file for administration and control purposes has different control fields for the shared data or record to be accessed (FIG. 1). For access administration and control of the records, each control field contains information and is preceded by a search key (for example, A1, A2, A3) which is directly (identically) or indirectly associated with the search key (DA1, DA2, DA3) of the respective shared data (records 1, 2, 3).

When a particular shared record, for example, record 1, in the application program of a processor (for example, processor 2, FIG. 1) is addressed for reading or writing (by specifying the search key, for example, A1), the control field for this record is initially addressed by means of the lock instruction, using that search key. This causes the lock file to be blocked for competing access requests (in IBM operating system VSE, for example, by the instruction RESERVE DISK). Then the information of the addressed control field is read into the main memory of the requesting processor (read operation R) and it is determined whether the processor's access request may be granted.

If it is, the information of the control field is updated according to the request (or release) (update operation) and written back into the associated control field of the lock file (write operation W). The lock file is then released for further access operations (in IBM operating system VSE, for example, by the instruction RELEASE DISK).

If the request of the processor resulting in the lock instruction cannot be granted, the lock file is released for further access operations and control is returned back to the application program with a corresponding message or (after some time has passed) a renewed request is issued to the lock file by means of the search key.

Figure 2:
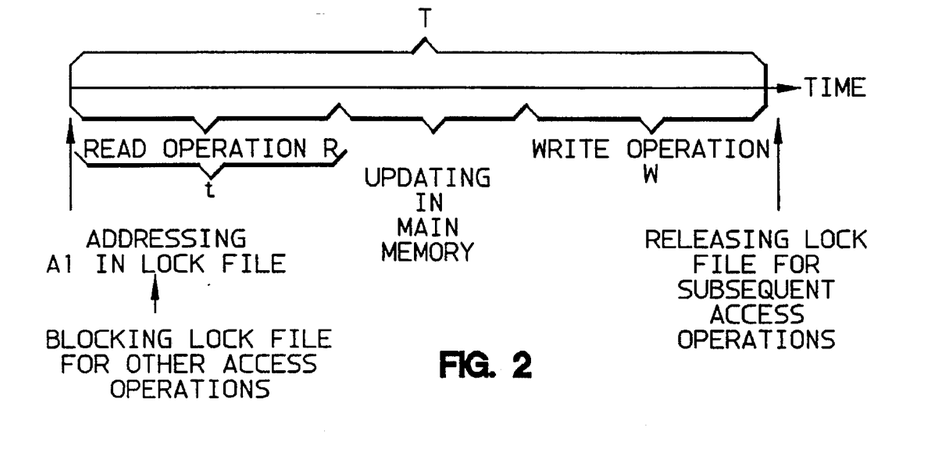
FIG. 2 is a prior art lock file time diagram for a read and a write operation in the multiprocessor system of FIG. 1.

In these steps, the execution of the read operation R requires a substantial amount of time t, roughly 40 to almost 50 per cent of the total time T, of the periods represented in FIG. 2.

Accordingly, a general object of the present invention is to reduce the administration and control time required to access a data object.

SUMMARY OF THE INVENTION

The invention is directed to an apparatus for and a method of controlling access to data in storage which data and storage are shared by a plurality of processors. Each of the processors has a local main storage. The shared storage is located outside of the main storage and stores a lock file. The lock file comprises a plurality of control fields containing access administration information authorizing the processors to access the data when not currently being accessed by another processor and a status identification code for the data to indicate whether another of the processors is currently accessing the data. Each of the control fields is associated with a corresponding data address. In response to a data access request from one of the processors, access administration information associated with the requesting processor for the type of data access request is written from the requesting processor to the shared storage without first reading the stored access administration information from the lock file. Next, the access administration information written by the processor is compared to the stored access administration information. If the comparison indicates that the requesting processor is authorized to access the requested data and if the status identification code indicates that no other processor is currently accessing the requested data, the status identification code in the storage is updated to indicate that the processor is currently accessing the data.

DETAILED DESCRIPTION OF THE PREFERRED EMBODIMENT

The invention works according to the optimistic assumption principle which is based on the fact that in many applications during which several processors compete for access to a shared record there is a high probability (exceeding 90%) that the content of the respective control field in the lock file, namely access administration and control data, will allow one of the processors to access the shared data or record immediately. If access rights are granted, it is highly probable that the content of the control field concerned has not been changed by other entries since the previous request for access was granted.

This high degree of probability is referred to as an "optimistic assumption" in the description below. It is assumed that the lock file control field most probably has the expected content. Special conditions apply only in exceptional cases.

Figure 3:
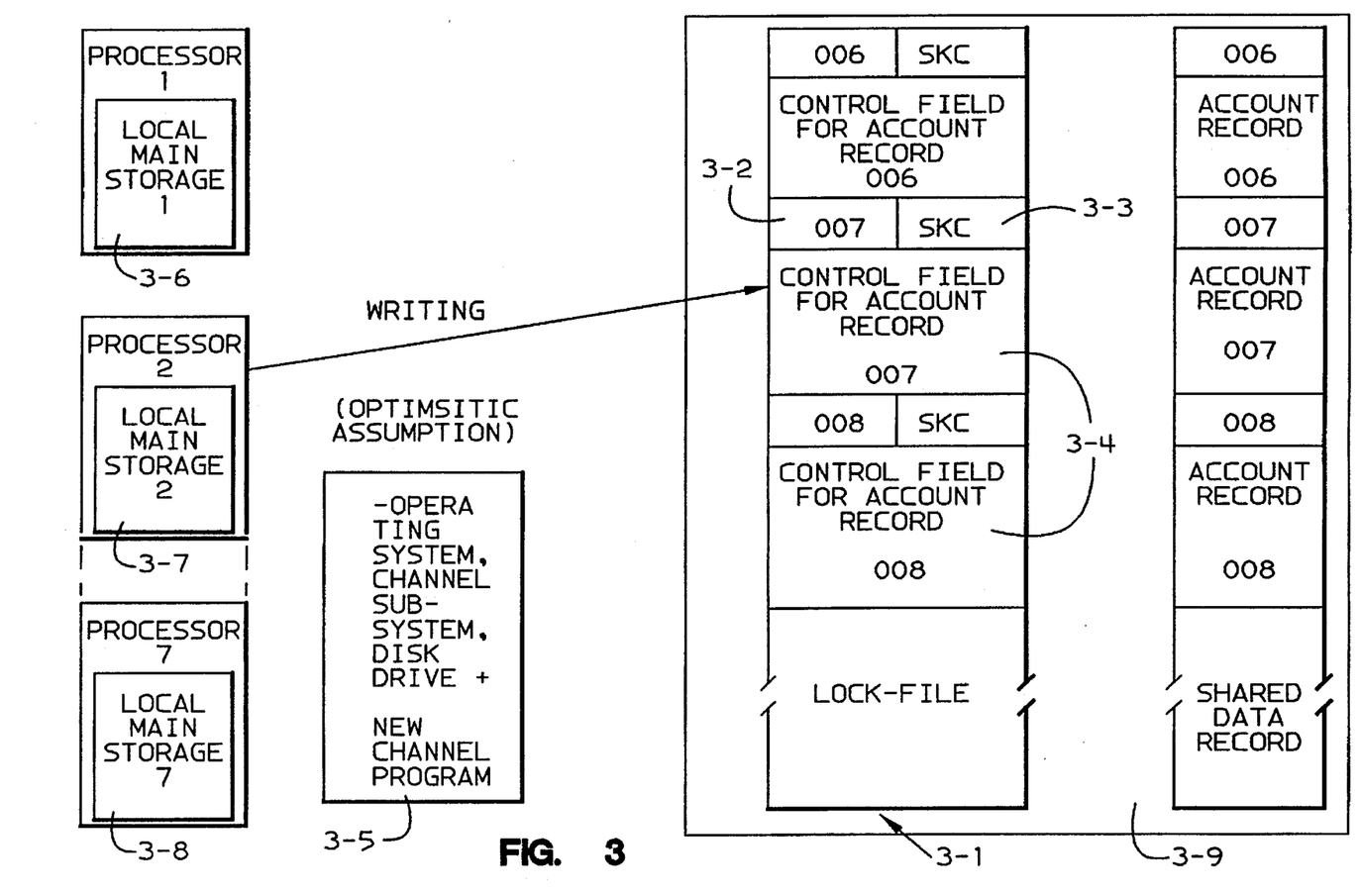
FIG. 3 is a partial schematic diagram of a multiprocessor system with a shared data record and a lock file for an optimistic assumption-based access administration and control method according to the present invention.

For rapidly verifying the optimistic assumption, each control field in the lock file is associated with a status identification code SKC (see FIG. 3).

Assuming a read instruction for an account record with the number 007 is issued in an application program of a processor 2 (of seven). By using the search key "007" during the execution of the lock instruction, the part of the lock file containing the control field for record 007 is addressed for writing; in addition to the number 007, refer to 3-2 for instance, this control field 3-4 is associated with the status identification code SKC 3-3. By means of a write operation, access administration information, such as "exclusive access right of processor 2 to the account record with the number 007", is entered in the control field.

It is optimistically assumed that the information may be written into the control field immediately, which would be the case if a) the control field contains no information at all at that stage or b) the control field information may be overwritten.

These possibilities are mirrored by the status identification code SKC in coded form.

As a result, by comparing the actual with the expected content of the status identification code associated with the control field, it is possible during writing to determine whether the write operation to be effected into the control field may be carried out without previously reading the content of the control field into the memory or local main storage 3-6 to 3-8 of the requesting processor.

Many data carriers containing the lock file, such as count key data disks (see IBM 3390 Storage Control Reference, IBM Manual GA 32-099) or other fast semiconductor technology-based equipment, which provide external memory space, permit tying the execution of a write operation (in this case into a control field of the lock file) to a particular condition. For count key data disks this may be, for example, a search key and a transfer-in-channel command in the channel program. In the present case, the status identification code SKC is initially examined to determine whether a write operation into the control field is permissible for a particular request. For this purpose, the expected and the actual content of the SKC code are compared with each other without a time-consuming SKC read operation into the main memory (local main storage) 3-7 of processor 2. Instead, as previously mentioned, a channel program or some other measure is used, so that the time-consuming read operation R (FIG. 2) is eliminated.

Thus, a channel program, processed within the channel sub-system, together with the conditional writing capability of a count key data disk are adequate means for implementing the various aspects of accessing (storing, writing comparing, updating and reading) of shared data in the shared storage 3-9.

If the examination of the status identification code SKC shows that the write operation into the control field for account record 007, refer to 3-2 for instance, may be executed, this write operation is carried out and the status identification code SKC is updated according to the write request. Thus, it is examined, for example, whether SKC is 0 (meaning the control field contains no access administration information, i.e., access rights have not yet been granted). If SKC is 0, the request is written into the control field and SKC is set to 1 (meaning the control field now contains access administration information, i.e. access rights have been granted).

Assuming the processing of account record 007 by the application program of processor 2 is now completed, then the access rights for this record should be returned. By using "007", the unlock instruction addresses that part of the lock file for writing in which the control field for record 007 is contained. At this stage, it is optimistically assumed that the control field has not been updated since. This may be verified in that during the writing of the unlock instruction into the control field it is examined whether SKC still has the expected value—in this case, for instance, SKC=1. If it has, the write operation for the unlock instruction may be executed (this process is completed without reading information from the lock file into processor 2); alternatively, if the assumption does not apply, special measures will be required.

(This may be the case if SKC has since been set to another value, e.g., SKC=2, because record 007 is being or has since been read by another processor.)

In this manner the optimistic assumption does away in particular with the time-consuming read operation for the content of the control field into the main memory, as is required in prior art equipment. Where several processors compete for access to a shared data stock this leads to enormous time savings during program execution. In addition, by blocking the lock file on fewer occasions, the performance is noticeably increased, i.e. the waiting time for a request is considerably reduced. An example of two processors accessing a record is described in detail in conjunction with FIG. 6.

Figure 4:
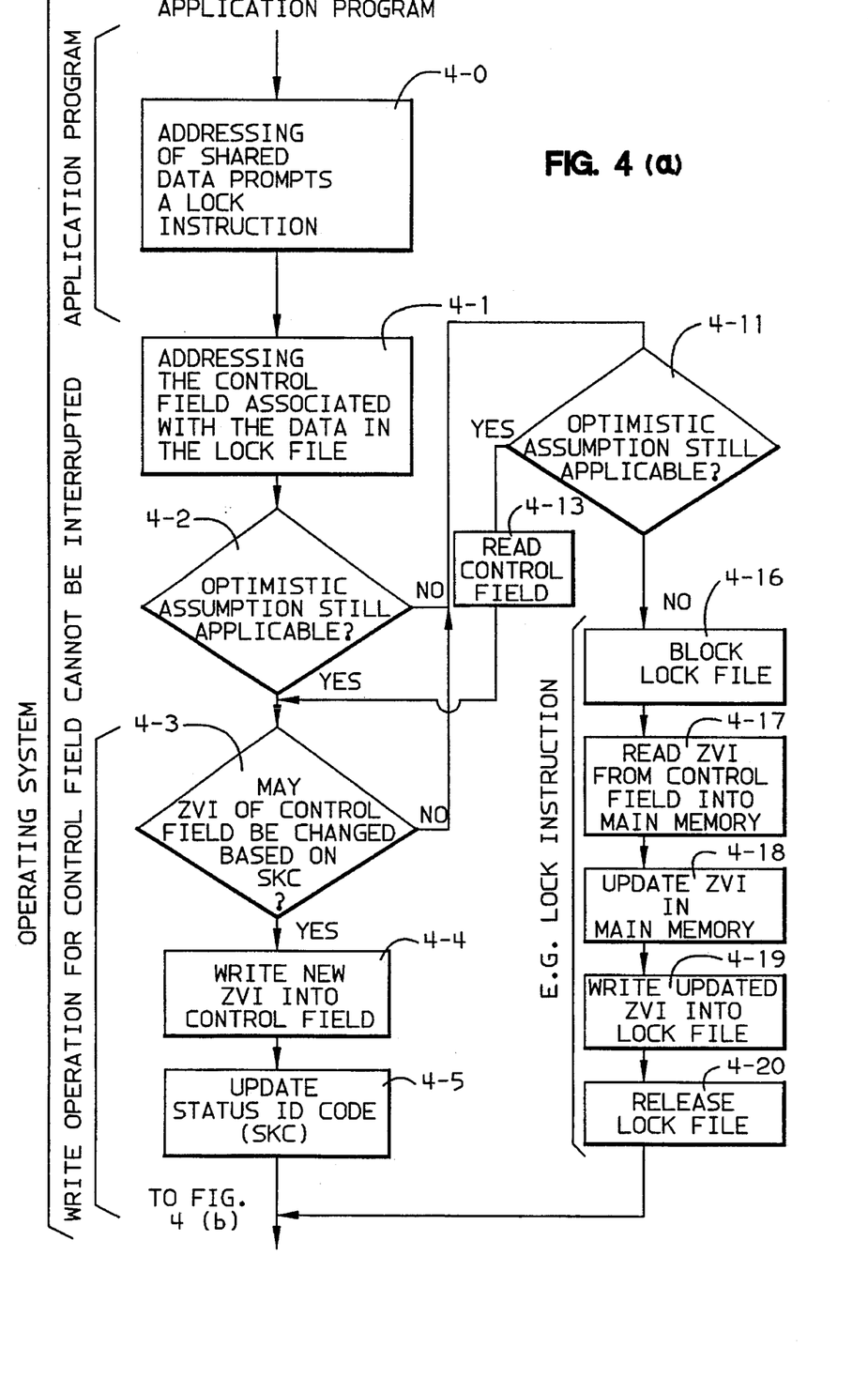
FIGS. 4A, 4B are function diagrams illustrating the optimistic assumption-based method and taking account of application program and operating system operations.
Figure 4B:
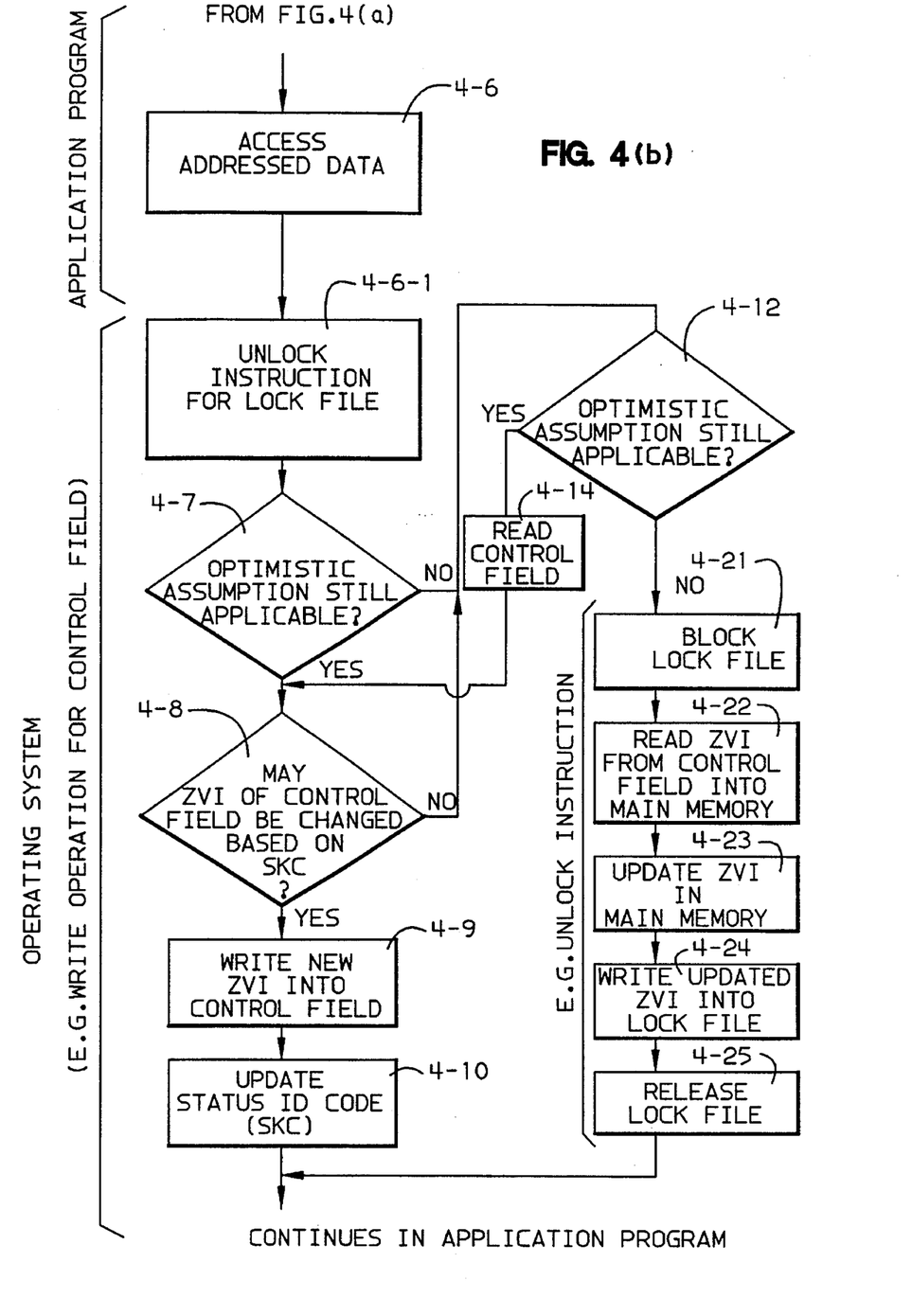

FIGS. 4A and 4B are function diagrams of the optimistic assumption-based method according to the invention, taking account of application program and operating system operations. These diagrams also consider exceptional cases which are outside the optimistic assumption.

The individual function blocks in the diagrams are numbered 4-0 to 4-20 (excluding 4-15); there is information specifying which steps are executed by the application program and which are executed by the operating system.

If shared data (e.g. a particular account record) is to be addressed by a search key (the account number) in step 4-0 (for performing a read or write operation), this will trigger the lock instruction on the part of the application program and on the part of the operating system, in step 4-1, the addressing of the control field associated with the data in the lock file. During the execution of the lock instruction it is decided in step 4-2 whether the optimistic assumption still applies. If it does, steps 4-3, 4-4 and 4-5 are carried out in an uninterruptable operation. In step 4-3, it is examined whether the content of the control field, the access administration information ZVI, may be changed by virtue of the status identification code SKC. If it may be changed, the administration information, i.e. the new ZVI, resulting from addressing the data (in 4-0) for a read or write operation is written into the control field. In step 4-5, the status identification code SKC is then updated. The sequence of the steps 4-3, 4-4 and 4-5 cannot be interrupted, which phenomenon is often referred to as "atomic writing". After the new information has been successfully entered in the lock file, the operating system, after step 4-5, again branches to the application program where the addressed data may be accessed in step 4-6. If the application program returns its access rights in step 4-6-1 with an unlock instruction, step 4-7 is implemented which queries whether the optimistic assumption still applies. (Such a query may be used to limit unsuccessful access attempts to a predetermined number.) In the YES-branch of step 4-7 (analogous to steps 4-3, 4-4 and 4-5) the access rights are withdrawn in steps 4-8, 4-9 and 4-10 (the unlock instruction is carried out), i.e. a new ZVI is entered in the lock file. Upon completion of step 4-8 (querying the expected SKC), new access administration information ZVI is written into the control field if the query is positive, and the status identification code is updated accordingly in step 4-10, for example, to the effect that the control field is now empty and may be overwritten without having to be read later on.

Then, the operating system again branches to the application program. If the queries in step 4-3 and 4-8, respectively, turn out negative, a branch is taken to step 4-11 or 4-12, as in response to a negative answer to the query in step 4-2 or 4-7 "does the optimistic assumption still apply?". In step 4-11 or 4-12 the validity of the optimistic assumption is again queried. In the case of a positive result, a branch is taken to step 4-3 or 4-8 after the control field has been read in step 4-13 or 4-14 and the current values of ZVI and SKC are known. In the NO-branch of step 4-11 or 4-12, the lock file is processed according to the prior art. In the NO-branch of step 4-11 (4-12), for example, this means that the lock file is initially blocked in 4-16 (4-21) and that, subsequently, in step 4-17 (4-22), the access administration information is read from the control field into the main memory. (It is expressly pointed out that when proceeding from the optimistic assumption, steps 4-16 (4-21) and 4-20 (4-25) are eliminated in particular. These steps are carried out only in standard (time-consuming) methods. In step 4-18 (4-23), the control field information ZVI is updated in the main memory. The updated control field information ZVI is written into the associated control field of the lock file in step 4-19 (4-24). Then, in step 4-20 (4-25), the lock file is released. In steps 4-16 to 4-20, a processor may be granted access rights, for example, to data addressed by a lock instruction. Upon completion of step 4-20, a branch is taken to step 4-6 in which the addressed data is accessed in the application program.

A program sequence analogous to that in steps 4-16 to 4-20 applies to the NO-branch of step 4-12. In this program branch (4-21 to 4-25) access rights previously allocated in response to a lock instruction may be withdrawn.

The optimistic assumption-based method according to the invention may be used for various applications. It may be employed, for example, for administering the access of several processors to a shared data stock or for file administration where several processors access a shared catalog.

Figure 5:
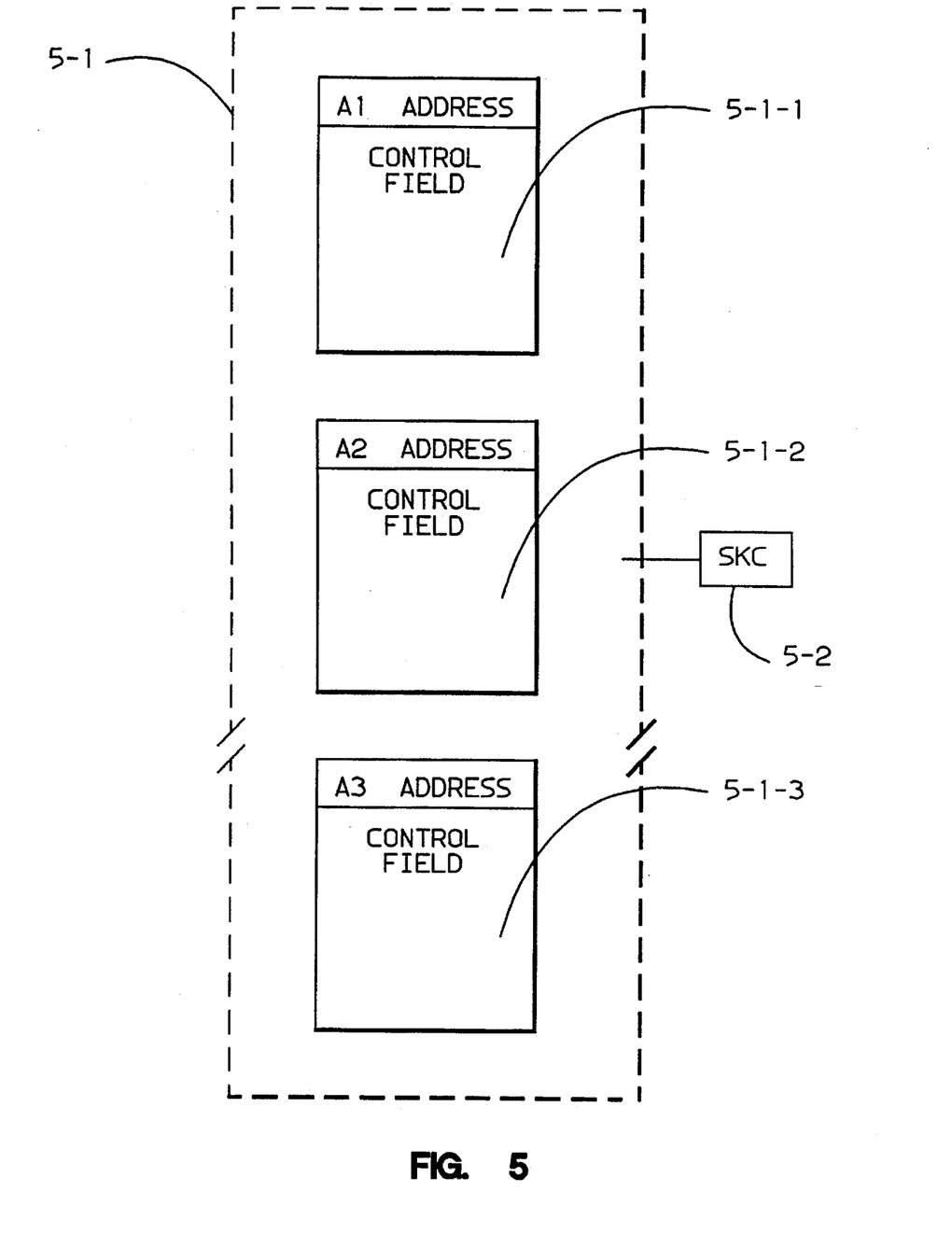
FIG. 5 shows a group of control fields with a common status identification code.

In FIG. 3, each control field, in addition to the random address (006, 007, 008) of the data, is associated with a status identification code SKC 3-3. Also conceivable are applications (FIG. 5) for which a group (block) 5-1 of control fields, rather than each control field, are associated with a common status identification code SKC (5-2). (The data addresses in this example are A1, A2 and A3.) In this connection SKC could be 0: block empty (all control fields empty), i.e. an access right may be granted immediately;

SKC could be 1: block not empty (at least one control field not empty), i.e. an access right may only be granted after detailed examination. (Since the last access to a control field, when SKC was set to 1, there has been no further access, for, otherwise, SKC would have been set to 2.)

Examples of different kinds of access authorization and control might read: "This record may only be read by processor 3 or processor 4" or "this record may only be updated by processor 6", etc., etc.

Figure 6:
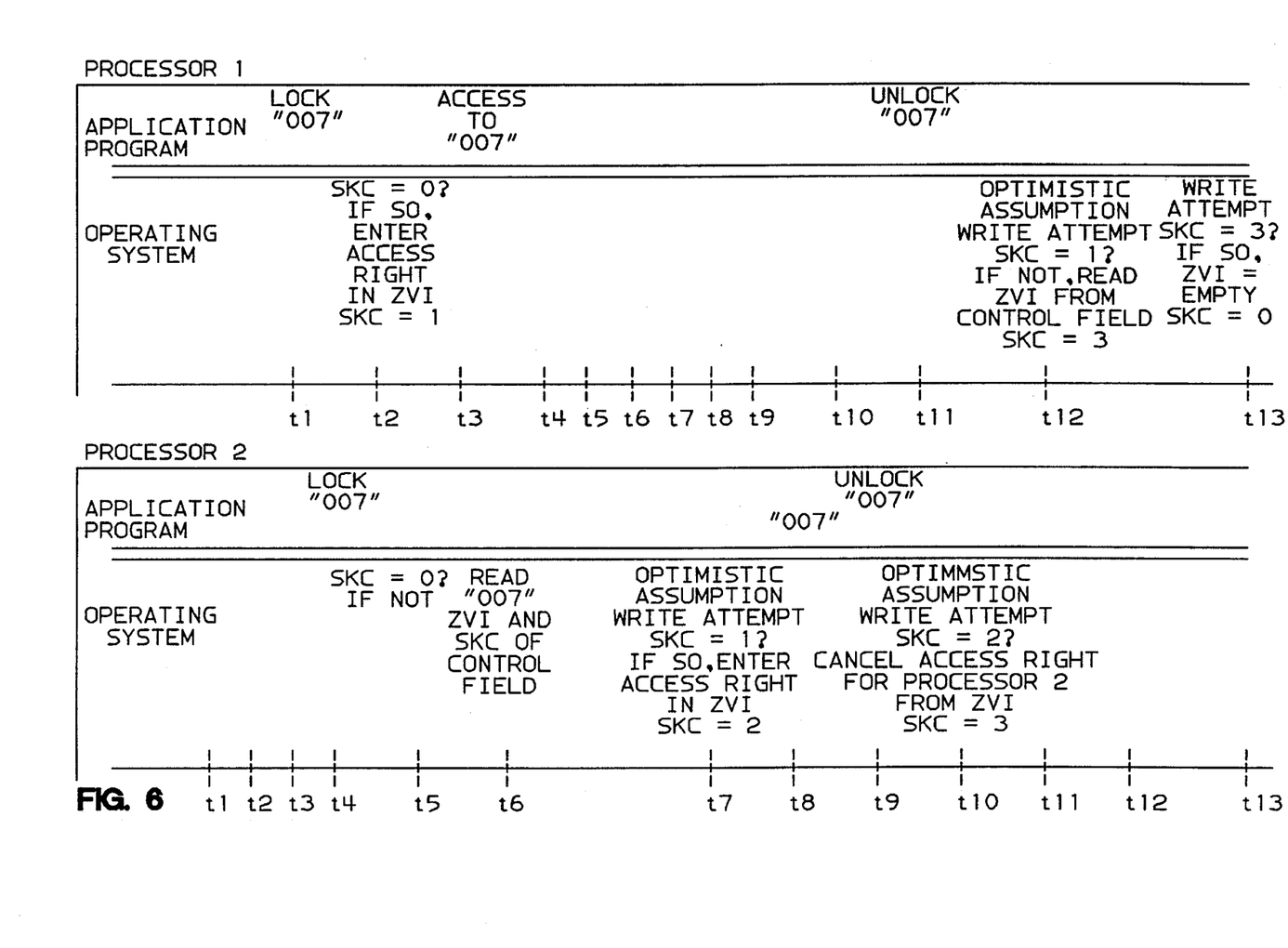
FIG. 6 is a schematic time diagram for two processors accessing a record.

FIG. 6 is a schematic time diagram illustrating how two processors at different times access a record addressable by the key "007" for executing a read instruction. The illustration distinguishes between the application program and the operating system for each processor. The different times at which operations are carried out or initiated are designated as t1 to t13. At the time t1, a read request is issued by processor 1 to record 007. This triggers a lock 007 instruction. For granting access to processor 1, it is examined at the time t2 whether the status identification code associated with the control field of record 007 in the lock file is 0. If it is (the optimistic assumption applies), the access administration information ZVI may be entered in the control field in response to the request without a read operation and the status identification code SKC may be set to 1.

By means of the access authorization granted at the time t2, record 007 may be accessed for reading at the time t3. At the time t4, processor 2 also wants to read record 007. This triggers a further lock 007 instruction. For granting processor 2 access, it is examined at the time t5 whether the status identification code for the control field of 007 is still 0. As it is not (the optimistic assumption does not apply, as the status identification code has already been set to 1 at the time t2), the access administration information ZVI of the control field for 007 and the SKC are read into processor 2 at the time t6. There it will be found that the status identification code is "1". From the access administration information ZVI it is concluded that currently another processor has access to 007. At the time t7, optimistically assuming that SKC is still "1", a further write operation into the control field for 007 will be attempted. In this case, the optimistic assumption applies, and at the time t7 the new ZVI is entered and the status identification code is set to "2". At the time t8, processor 2 may read record 007. At the time t9, after completion of the read operation for record 007, processor 2 will give an unlock 007 instruction through the application program. This prompts the operating system, which optimistically assumes that SKC is still "2" to write data into the control field. As the optimistic assumption applies, the access right for processor 2 is cancelled at the time t10 and SKC is set to 3. At the time t11, the access rights for 007 requested by processor 1 at the time t1 are to be cancelled by an unlock 007 instruction. As a result, at the time t12, it is examined by writing whether the status identification code is still "1" (it was set to that value at the time t2). As the result of this query is negative (the optimistic assumption does not apply, since up to the time t12, SKC has the value "3"), the access administration information of the control field and the SKC are read into processor 1. During this, it is concluded from ZVI that the last access rights for record 007 have been returned and that the value of SKC is 3. At the time t13, an attempt is made to write the control field for 007 with the new optimistic assumption that SKC is still "3". As it is, ZVI in the control field is set to empty and the status identification code is updated to 0, which means that in response to the next request access rights may be entered without previously reading ZVI.

This example shows how (rare) overlapping access operations are being handled. Normally, the access operations of the processors for a record are not overlapping and, since the optimistic assumption applies, the control field does not have to be read according to the invention.

I claim:

1. A method of controlling access to data in storage, said data and storage being shared by a plurality of processors, each of said processors having a local main storage, the shared storage being located outside of the local main storages, said method comprising the steps of:

storing in said shared storage a lock the comprising access administration information authorizing the processors to access said data when not currently being accessed by another processor in an exclusive manner and a plurality of status identification codes to indicate whether another of the processors has updated the access administration information;

requesting access by one of said processors to data in the shared storage;

in response to the access request, comparing the status identification code provided by the requesting processor to said stored status identification code to determine whether the requesting processor is authorized to immediately update the access administration information, if the comparison indicates that the requesting processor is authorized to immediately update the access administration information, writing the access administration information associated with the requesting processor for the type of data access request, from the requesting processor to the shared storage without first reading the corresponding stored access administration information from the lock file; and updating the respective status identification code in said shared storage to indicate that said access administration information has been updated.

2. A method as set forth in claim 1 wherein if the comparison indicates that the requesting processor is not authorized to immediately update the access administration information, further comprising the step of reading the stored access administration information into the local main storage of the requested processor, said method further comprising the step of updating the access administration information in the local main storage of the requesting processor and then writing the updated access administration information and status identification code to said shared storage.

3. A method as set forth in claim 1 wherein access administration information for a plurality of separately addressable data addresses have a common status identification code.

4. A system for controlling access to data shared by a plurality of processors, said system comprising:

a plurality of main storages local to and serving said plurality of processors, respectively; a shared storage located outside of the plurality of local main storages for storing the shared data;

means for storing in said shared storage a lock file comprising access administration information authorizing the processors to access said data when not currently being accessed by another processor and a plurality of status identification codes to indicate whether another of the processors has updated the access administration information;

means, responsive to a data access request from one of the processors, for comparing the status identification code provided by the requesting processor to said stored status identification code to determine whether the requesting processor is authorized to immediately update the access administration information, and if the comparison indicates that the requesting processor is authorized to immediately update the access administration information, means writing access administration information from the requesting processor to the shared storage without first reading the corresponding stored access administration information from the lock file, updating the respective status identification code in said shared storage to indicate that said access administration information has been updated.

5. A system as set forth in claim 4 further comprising means, responsive to the comparison which indicates that the requesting processor is not authorized to immediately update the access administration information, for reading the stored access administration information into the local main storage of the requesting processor, and means for updating the access administration information in the local main storage of the requesting processor and then writing the updated access administration information and status identification code to said shared storage.

6. A system as set forth in claim 4 wherein access administration information for a plurality of separately addressable data addresses have a common status identification code.

7. A system as set forth in claim 4 wherein said shared storage is a magnetic disk.

* * * * *

UNITED STATES PATENT AND TRADEMARK OFFICE
CERTIFICATE OF CORRECTION

PATENT NO.  : 5,566,319
DATED       : 10/15/96
INVENTOR(S) : Norbert Lenz

It is certified that error appears in the above-indentified patent and that said Letters Patent is hereby corrected as shown below:

Column 6, line 61 - delete "lock the" and insert --lock file--.

Signed and Sealed this

Twenty-seventh Day of October, 1998

Attest:

BRUCE LEHMAN

*Attesting Officer*   *Commissioner of Patents and Trademarks*